United States Patent [19]

Perry, Jr.

[11] 3,938,673
[45] Feb. 17, 1976

[54] PORTABLE CONCRETE BATCH PLANT

[76] Inventor: L. F. Perry, Jr., 113 Highview, Georgetown, Tex. 78626

[22] Filed: Oct. 7, 1974

[21] Appl. No.: 512,517

[52] U.S. Cl. .................... 214/2; 214/17 R; 259/149; 259/154; 259/165; 259/167
[51] Int. Cl.² ........................................ B65G 69/00
[58] Field of Search .......... 259/154, 161, 162, 163, 259/164, 165, 166, 167, 173, 160, 145, 148, 149; 214/2, 17 R

[56] References Cited
UNITED STATES PATENTS

| | | | |
|---|---|---|---|
| 3,189,327 | 6/1965 | Domenighetti | 259/164 |
| 3,343,688 | 9/1967 | Ross | 259/154 |

Primary Examiner—Robert W. Jenkins
Attorney, Agent, or Firm—Head, Johnson, and Chafin

[57] ABSTRACT

A concrete batch plant designed and constructed for transport to the site wherein the concrete is to be used, said plant being disposed in a substantially horizontal position during transport thereof and in a substantially vertical position during operation thereof for producing concrete batches. The apparatus comprises cement storage means for storing a quantity of dry bulk cement therein, weigh bin means for receiving a preselected quantity of the dry cement from the cement storage means, water bin means for receiving a preselected quantity of water therein, aggregate weigh bin means for containing a quantity of aggregate therein and discharging the same in preselected quantities, and means for elevating the aggregate storage bin means from the charging or loading position to the dumping or discharging position for discharging the contents thereof into a suitable mixer means such as a Ready-mix truck, said elevating means also being utilized for elevating the apparatus from said horizontal position to said vertical position and return to horizontal position. Electronic means is also provided for automatic loading of the water weigh bin and cement weigh bin with said preselected quantities of material according to weight for the desired concrete mixture, as well as visual electronic means for loading of the aggregate weigh bin means.

6 Claims, 2 Drawing Figures

PORTABLE CONCRETE BATCH PLANT

BACKGROUND OF THE INVENTION

1. Field of the Invention

This invention relates to improvements in concrete mixing apparatus and more particularly, but not by way of limitation, to a concrete batch plant adapted for either stationary or portable operation.

2. Description of the Prior Art

Many sites wherein concrete is to be poured are located a substantially great distance from the concrete plant, and it is the usual practice to load a concrete mixer vehicle at the plant site and mix the concrete batch in the vehicle mounted mixer during transport to the remote site. This procedure has disadvantages in that it is usually desirable to mix the concrete batch for a particularly selected time period in order to assure an efficient end product, and there is also usually an optimum time for dumping the mixed concrete into the forms, or the like, to insure that the concrete does not "set up" or begin to harden before the pouring and spreading operation can be completed. The time of travel of the mixer vehicle from the plant site to the ultimate use location may vary greatly, depending upon conditions which may be completely out of the control of the operator of the vehicle, such as snarled traffic conditions, vehicle break down, and the like. In addition, there are many instances wherein a plurality of concrete batches may be required, with some of the batches being smaller than other batches, which is difficult and expensive to arrange with present day methods and means.

SUMMARY OF THE INVENTION

The present invention contemplates a concrete batch plant which may be transported to or near the site wherein the concrete is to be utilized. The novel apparatus comprises a main cement storage bin or silo, a water weigh bin, a cement weigh bin, and an aggregate weigh bin mounted on support means which may be transported by a wheeled vehicle, or the like, from site to site in accordance with the location wherein it is desired to utilize concrete. The support means is disposed in a substantially horizontal position during transporting thereof, and is elevated to a substantially vertical position for operation thereof during a concrete batching operation. The cement storage bin or silo is in communication with the cement weigh bin through any suitable means whereby a preselected quantity of the dry cement may be deposited within the cement weigh bin according to weight. A preselected quantity of water is deposited in the water weigh bin in accordance with weight, said proportions being selected in accordance with the desired end result of the concrete mixture. The aggregate weigh bin is carried by a suitable lifting apparatus whereby the bin may be charged or loaded in a lowered position of the bin and discharged or dumped in a raised position of the bin. The aggregate bin is moved from the lowered position to the raised position by the same means which raises and lowers the support means, and is moved through an overhead arc whereby the bin remains in its normal upright position at all times, thus precluding accidental loss of material therefrom, and in the raised position thereof, the aggregate may be readily discharged into the mixer truck in accordance with the desired weight thereof. Of course, the truck mixer is utilized in the usual or well known manner for mixing the ingredients to provide the desired concrete batch.

DESCRIPTION OF THE PREFERRED EMBODIMENT

Figure 1:
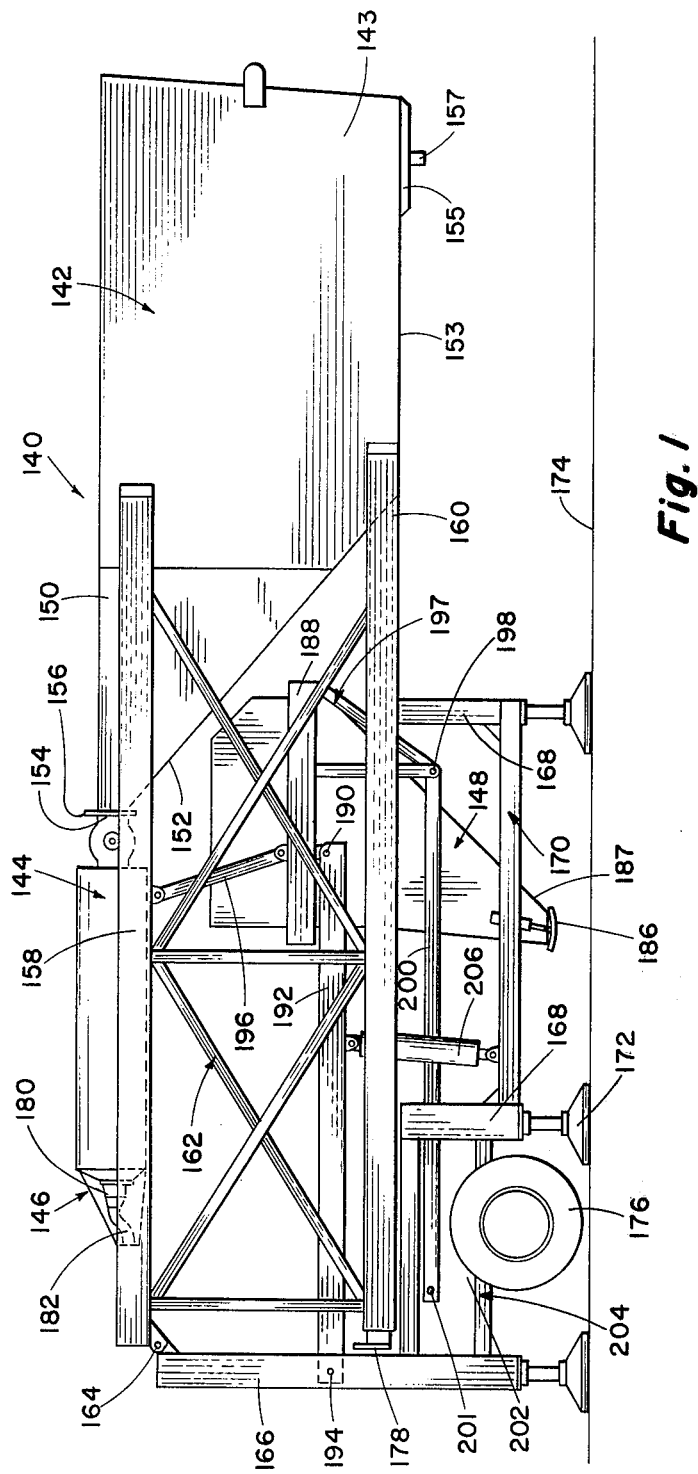
FIG. 1 is a side elevational view of a portable concrete batch plant embodying the invention and depicted in the substantially horizontal transporting position thereof.

Referring to the drawings in detail, reference character 140 generally indicates a portable concrete batch plant comprising a cement silo 142, a water weigh bin 144, a cement weigh bin 146, an aggregate weigh bin 148, and a mixer 147 of a usual concrete mixer type vehicle 149. The silo 142 may be of any suitable construction, and as shown herein is provided with a main housing portion 143 which may be either substantially cylindrical or of a rectangular cross-sectional configuration, and a lower portion 150 as viewed in FIG. 2 in intimate communication with the main portion 143. The portion 150 is provided with a tapered portion 152 extending between the main portion 143 and a discharge opening or outlet 154 having a suitable gate member 156 cooperating therewith for selectively discharging dry cement from the silo 142 in a manner as will be hereinafter set forth. One side plate 153 of the silo 142, and which is conterminous with the tapered portion 152, becomes a bottom plate in the horizontal position shown in FIG. 1. An upper plate 155 of a tractor fifth wheel (not shown) is welded or otherwise suitably secured to the plate 153 and a king pin 157 is welded to the plate 155 as is well known and for a purpose as will be hereinafter set forth. The silo 142 is secured to a pair of spaced first support beams 158 (only one of which is shown in the drawings), and a second pair of spaced support beams 160 (only one of which is shown in the drawings) in any suitable manner, such as by welding, or the like.

The support beams 158 and 160 are preferably mutually parallel and are spaced apart by suitable cross members generally indicated at 162 to provide a tower-type support structure for a purpose as will be hereinafter set forth. The beams 158 are pivotally secured at 164 to a pair of spaced support legs 166 (only one of which is shown in the drawings), and the legs 166 cooperate with a plurality of additional spaced support legs 168 which form a part of a framework 170 which supports the entire apparatus 140 as will be hereinafter set forth. In addition, each leg 166 and 168 is provided with an adjustable or telescopically arranged foot member 172 which may be selectively moved into engagement with the surface 174 of the ground, or elevated with respect thereto, as desired. A pair of axially aligned wheels 176 (only one of which is shown in the drawings) are suitably journalled on the frame 170 for supporting the apparatus 140 when the feet 172 are raised from engagement with the surface 174, and for providing portability for the apparatus 140 during transport thereof, as will be hereinafter set forth. A foot member 178 is adjustably or telescopically secured to the outer end of each of the support beams 160 for a purpose as will be hereinafter set forth.

The water weigh bin 144 may be of any suitable construction, and as shown herein is preferably of an elongated tank-type configuration secured to one of the beams 158 in any suitable manner (not shown), and preferably disposed inboard thereof, as shown in the drawings. A suitable discharge pipe 180, or the like, is provided at one end of the water weigh bin 144 and is provided with a suitable hose or conduit 182 extending therefrom for a purpose as will be hereinafter set forth. In addition, it is preferable to provide a suitable valve (not shown) or the like in combination with the discharge pipe 180 and/or hose 182 for selectively controlling the discharge of water from the bin 144. A suitable supply or filler means (not shown) is also provided for charging of the water bin 144 with water, and suitable load cells (not shown) are provided in conjunction with the water weigh bin 144 and in operable connection with a central electronic weigh control system (not shown). Of course, any suitable electronic weigh control system may be utilized, but it is preferable to use the type known as the Weigh Systems Inc. system which includes a suitable control center or control box (not shown) conveniently mounted on the apparatus 140 for facilitating access thereto by the operator of the equipment, and suitable load cells connected between the water weigh bin, the aggregate weigh bin, the cement weigh bin and the control box. Prior to a concrete batching operation, the desired ratio of the components of the concrete by weight are dialed into the control box. In this manner, the actuation of the apparatus 140 is automatically controlled by the electronic system to provide optimum concrete batching in accordance with the desired end result.

The cement weigh bin 146 may be of any suitable type construction and as shown herein is of a tank-type construction rigidly secured to the other leg 150 oppositely disposed from the water weigh bin 144. One end of the cement weigh bin 146 is in communication with the cement silo 142 through a suitable delivery conduit 184, and the opposite end thereof is open for discharge of the contents thereof, but is provided with a suitable gate (not shown) for selective discharge of the contents from the cement weigh bin as is well known.

The aggregate weigh bin 148 may be of any suitable construction and as shown herein the upper end thereof is open for receiving material therein and the lower end thereof is provided with a suitable discharge gate member 186. In addition, it may be preferable to provide at least one angularly disposed bottom plate 187 for facilitating directing of the material within the bin 148 to the discharge gate 186, as is well known. The bin 148 is suitably suspended from three load cells (not shown) and a visual system (not shown) is provided in the electronic control system for indicating the percentage of filling of the bin 148, by weight, continually during loading of the aggregate bin 148 as will be hereinafter set forth.

The aggregate bin 148 is carried by a suitable support frame 188 which is pivotally secured at 190 to a beam 192 having the opposite end thereof pivotally secured at 194 to one of the support legs 166. A similar beam (not shown) is pivotally secured between the frame 188 and other support leg 166 in spaced aligned relation to the beam 192. A pair of removable strap members 196 (only one of which is shown) is pivotally secured between the frame 188 and the support beams 158 for a purpose as will be hereinafter set forth. A pair of suitable bracket members 197 (only one of which is shown) are provided on opposite sides of the frame 188 and the outer end of each bracket 197 is pivotally secured as shown at 198 to one end of an arm 200 (only one of which is shown). The opposite ends of the arms 200 are pivotally secured as shown at 201 to a pair of spaced blocks 202 rigidly secured to a portion 204 of the frame 170 in the proximity of the support legs 166. A pair of suitable hydraulic cylinders 206 (only one of which is shown) are pivotally secured between the frame 170 and the beams 192 whereby extension or expansion of the cylinders 206 will pivot the beams 192 in a counterclockwise direction about the pivot connections 194 as viewed in the drawings, and contraction of the cylinders 206 will pivot the beams 192 in a clockwise direction about the pivot points 194.

Of course, the cylinders 206 may be operably connected with a suitable fluid reservoir (not shown) and the fluid reservoir may be powered by a suitable motor and pump (not shown). Whereas the cylinders 206 are preferably hydraulic cylinders, it is to be understood that they may be pneumatic cylinders, if desired.

When the portable concrete plant 140 is to be transported along a highway, or the like, to the site wherein it is desired to produce concrete batches, the beams 158 and 160 are disposed in the horizontal position therefor as shown in FIG. 1, and the usual or standard type highway tractor vehicle (not shown) provided with a fifth wheel (not shown) is backed into a position whereby the fifth wheel is disposed beneath the silo 142 in order that the king pin 157 is engaged and locked in the fifth wheel in the usual or well known manner. Of course, the feet 172 may then be suitably retracted within the respective legs 168 whereby the wheels 176 are in engagement with the surface 174 of the ground, and the tractor may be moved forwardly in the usual manner for pulling the plant 140 along the highway.

Figure 2:
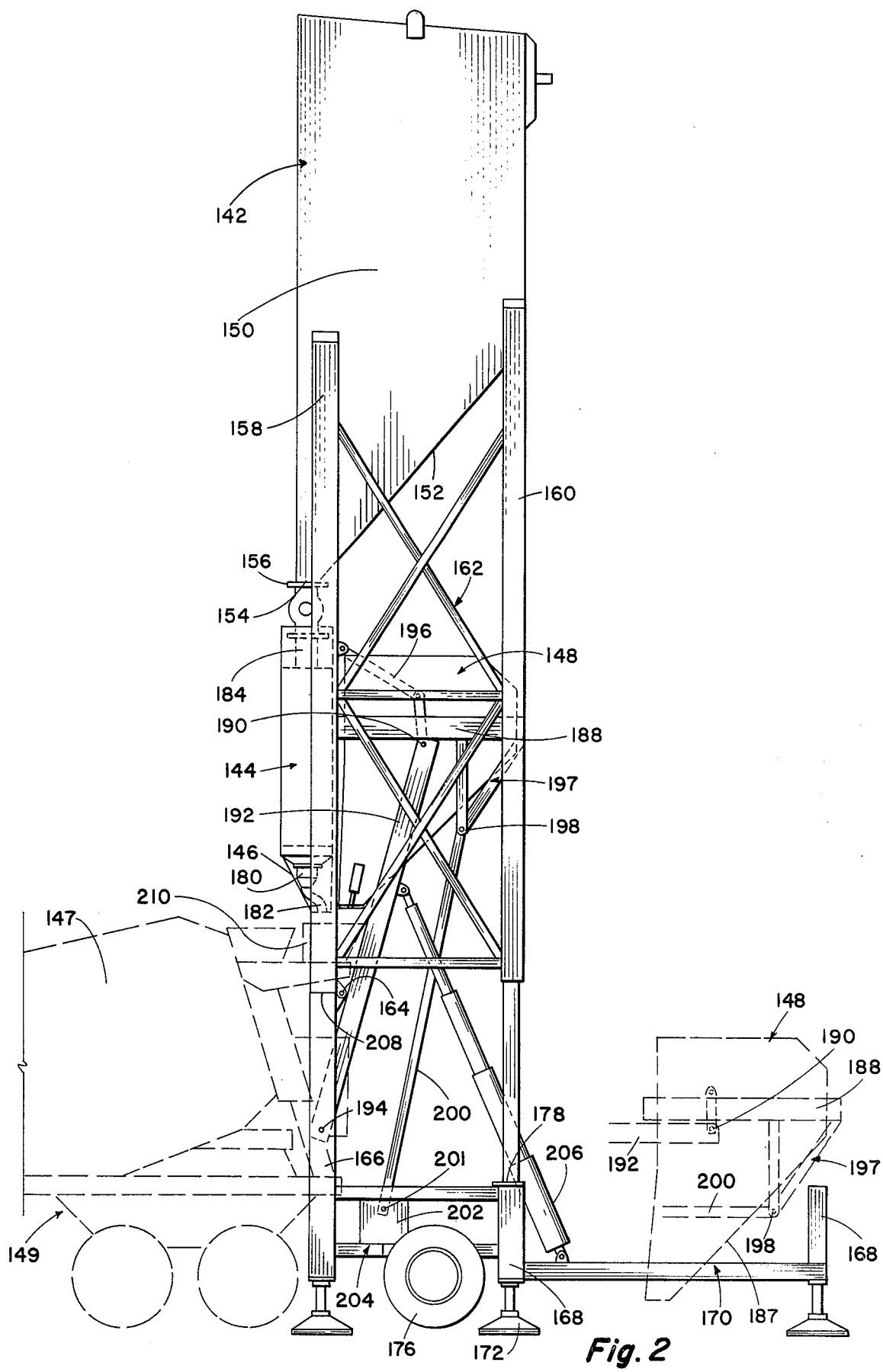
FIG. 2 is a side elevational view of a portable concrete batch plant embodying the invention and depicted in the raised operating position thereof, with portions shown in dashed lines for purposes of illustration.

When the apparatus 140 has reached the site wherein it is desired to produce concrete batches, the feet 172 may be set in place in the usual manner for engagement with the surface 174 of the ground, and for elevating the wheels 172 from engagement with the ground. The hydraulic cylinders 206 may then be activated in the usual manner for extending thereof in order that the beams 192 will be pivoted in a counterclockwise direction about the pivot points 194, as viewed in the drawings. The movement of the beams 192 is transmitted to the beams 158 through the connecting members 196, and the beams 158 are pivoted simultaneously with the beams 192. Of course, the cross members 162 cause the beams 160 to pivot simultaneously with the beams 158, and the pivoting may be continued until the lowermost end of the beams 158 rest against the uppermost ends of the support legs 166 as shown at 208 in FIG. 2. The feet 178 may then be extended and pinned or locked with respect to the beams 160 for engagement with the upper ends of the respective support legs 168 as shown in FIG. 2. In this manner, the apparatus 140 is supported in a vertical position, which is preferable during the batching operation.

It is to be noted that during the movement of the apparatus 140 from the horizontal position to the vertical position, the aggregate bin 148 remains in a substantially upright or vertical orientation due to the pivotal connection between the frame 188 and the beams 192. When the apparatus 140 has been raised or elevated to the vertical position, the removable straps 196 may be disconnected from the frame 188, and the cylinders 206 may be contracted whereby the beams 192 are pivoted in a clockwise direction about the pivot connections 194, as viewed in the drawings. The aggregate bin 148 is moved simultaneously with the beams 192 due to the pivotal connection of the frame 188 with the beams 192 until the bin 148 is lowered to the position shown in dashed lines in FIG. 2. It is again to be noted that the bin 148 will remain in the upright or vertical orientation thereof during both the raising and lowering thereof, and moves in an overhead arc during the raising and lowering whereby the accidental loss of the contents thereof is substantially eliminated.

In the lowered position of the bin 148, the sand and gravel may be loaded and weighed therein by the usual front end loader (not shown), or in any other suitable manner. As hereinbefore set forth, the aggregate bin 148 is suspended from three load cells (not shown) in any well known manner, and weighs at all times during operation of the apparatus. The operator of the loader (not shown) begins dumping gravel into the bin 148 while watching two rows of lights (not shown) provided on the side of the control housing of the electronic weighing system. When 80% of the desired quantity of gravel by weight, is accumulated within the bin 148, the first or bottom amber colored light automatically illuminates. When 90% of the quantity of gravel has accumulated within the bin 148, the second amber colored light illuminates. When 98% of the gravel has been loaded into the bin 148, the third amber light illuminates, and when 100% of the gravel has been loaded in the bin 148, the fourth or white light illuminates. Thus, the operator is provided with a visual indication of the progress of the loading operation. The loader operator then ceases the dumping of gravel into the bin 148, and starts dumping sand in the bin 148 on top of the gravel loaded therein. The operator watches the second row of lights and goes through the same sequence of 80%, 90%, 98% and 100% loading of the sand, by weight. When both white lights are on, the loader operator stops dumping sand into the bin 148, and preferably moves to a position away from the bin 148 in order that the bin 148 may be elevated from its loading position.

Subsequent to the loading or charging of the bin 148, the cylinders 206 may be extended for elevating the bin 148 to a position as shown in solid lines in FIG. 2 wherein the discharge gate 186 thereof will be in alignment with the charge hopper 210 of the mixer 147.

Of course, it is preferable to load or charge the cement silo 142 with dry bulk cement from a suitable tanker or tank truck (not shown). The dry bulk cement may be discharged from the silo 142 into the cement weight bin 146 by gravity through the discharge conduit 184. When the preselected quantity of cement, by weight, has been loaded into the cement weigh bin 146, the flow of cement from the silo 142 is stopped.

Water may be loaded into the water weigh bin 144 in any well known manner, such as through a hose from a suitable water source, with the flow of water to the bin 144 being stopped when the preselected weight of the water has been loaded therein. The weighed cement and weighed water may be discharged into the hopper 210 of the mixer 147 for discharge thereof into the mixer 147 as is well known. The sand may be measured, by weight, into the hopper 210 and discharged into the mixer 147, and the gravel may also be measured, by weight, into the hopper 210 for discharge into the mixer 147. The mixer 147 may then be operated in the usual manner for mixing a concrete batch from the ingredients which have been loaded therein. Of course, the concrete batch may be discharged from the mixer 147 for use in the usual manner.

When the apparatus 140 is to be transported to another site for further concrete batching operations, the strap members 196 may be replaced, and the cylinders 206 contracted for moving the apparatus 140 to the horizontal position therefor, whereupon the entire apparatus may be towed along the highway to the new site. It is to be noted that the cylinders 206 provide both the raising and lowering of the support frame and the raising and lowering of the aggregate bin.

From the foregoing it will be apparent that the present invention provides a novel portable concrete batching plant which may be moved from location to location, as desired, whereupon an entire concrete batching operation may be completed at the site wherein the concrete is to be used. The novel apparatus comprises a dry bulk cement silo, a water weigh bin, a cement weigh bin, an aggregate weigh bin mounted on a framework which permits transporting of the concrete batching plant from site to site. The aggregate bin is adapted for movement between a lowered position for loading thereof and a raised position for discharging the contents therefrom into the mixer whereby the cement, water and aggregate, all of which have been measured by weight ratios, may be mixed to provide the desired concrete batch or batches. The support frame is adapted to be raised to a vertical operating position, and is raised and lowered by the same elevating apparatus which raises and lowers the aggregate bin. Repeated concrete batches may be mixed at the site, as required, subsequent to which the entire portable plant may be moved to an additional site for producing still additional concrete batches.

Whereas the present invention has been described in particular relation to the drawings attached hereto, it should be understood that other and further modifications, apart from those shown or suggested herein, may be made within the spirit and scope of this invention.

What is claimed is:

1. A portable concrete batch weigh plant comprising support frame means movable between horizontal and vertical positions, cement silo means secured to the support frame means and movable therewith, cement weight bin means secured to the support frame means and movable therewith, said cement weigh bin means being in communication with the cement silo in one position for receiving dry cement therefrom, water weigh bin means secured to the support frame means and movable therewith, aggregate weigh bin means carried by the support frame means and movable independently with respect thereto, means operably secured between the support frame means and aggregate bin means for movement of the aggregate bin means through an overhead arc between lowered positions for loading thereof and raised positions for unloading thereof and for raising and lowering the support frame means between said horizontal and vertical positions, discharge means provided for said cement weigh bin and water weigh bin means for discharging dry cement and water therefrom, and discharge means provided for said aggregate bin means for discharging aggregate from the aggregate bin means in the raised position thereof.

2. A portable concrete batch weigh plant as set forth in claim 1 wherein the cement weigh bin means discharges a preselected qutntity of dry cement by weight therefrom, said water weigh bin means discharges a preselected quantity of water by weight therefrom, and the aggregate weigh bin means discharges a preselected qutntity of aggregate by weight therefrom.

3. A portable concrete batch weigh plant as set forth in claim 1 wherein the support frame means is disposed in a substantially horizontal position during transporting of the batch plant and is disposed in a substantially vertical position during a concrete batch weighing operation.

4. A portable concrete batch weigh plant as set forth in claim 1 wherein the raising and lowering means comprises fluid cylinder means operably connected between the support frame means and aggregate bin means.

5. A portable concrete batch weigh plant as set forth in claim 1 wherein the aggregate bin means is raised and lowered through an overhead arc during the raising and lowering of the support frame means and during the raising and lowering of the aggregate bin means.

6. A portable concrete batch weigh plant as set forth in claim 1 wherein the cement silo means is disposed above the cement weigh bin in the vertical position of the support frame means whereby dry cement is discharged into the cement weigh bin by gravity.

* * * * *